O. G. MAYER.
SAUSAGE LINKING MACHINE.
APPLICATION FILED JAN. 29, 1915.
1,179,543.
Patented Apr. 18, 1916.
3 SHEETS—SHEET 3.
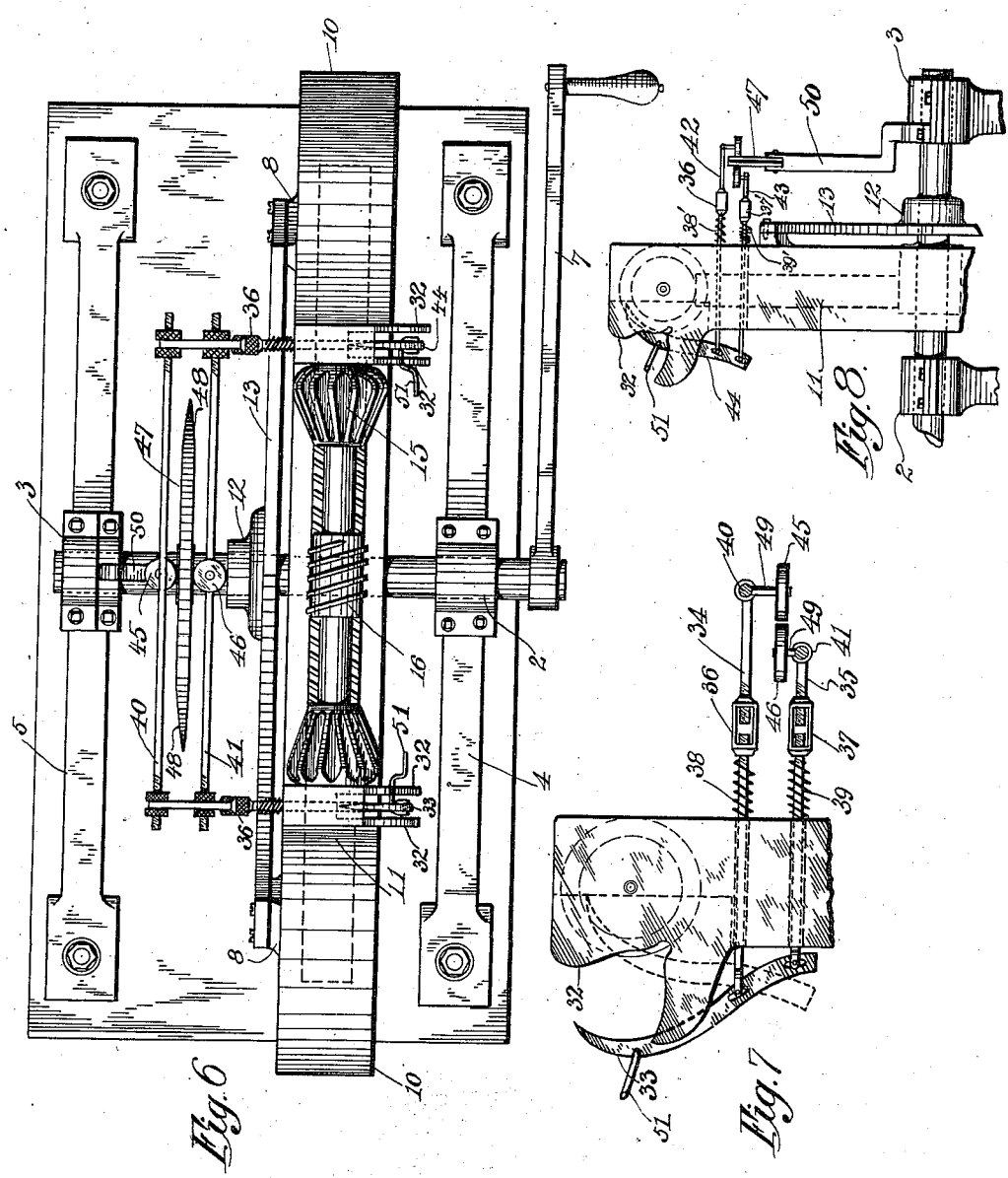
WITNESSES:
Berthold Oblatt
Otto Janis
INVENTOR.
Oscar Gottfried Mayer
BY
Winger
ATTORNEYS.

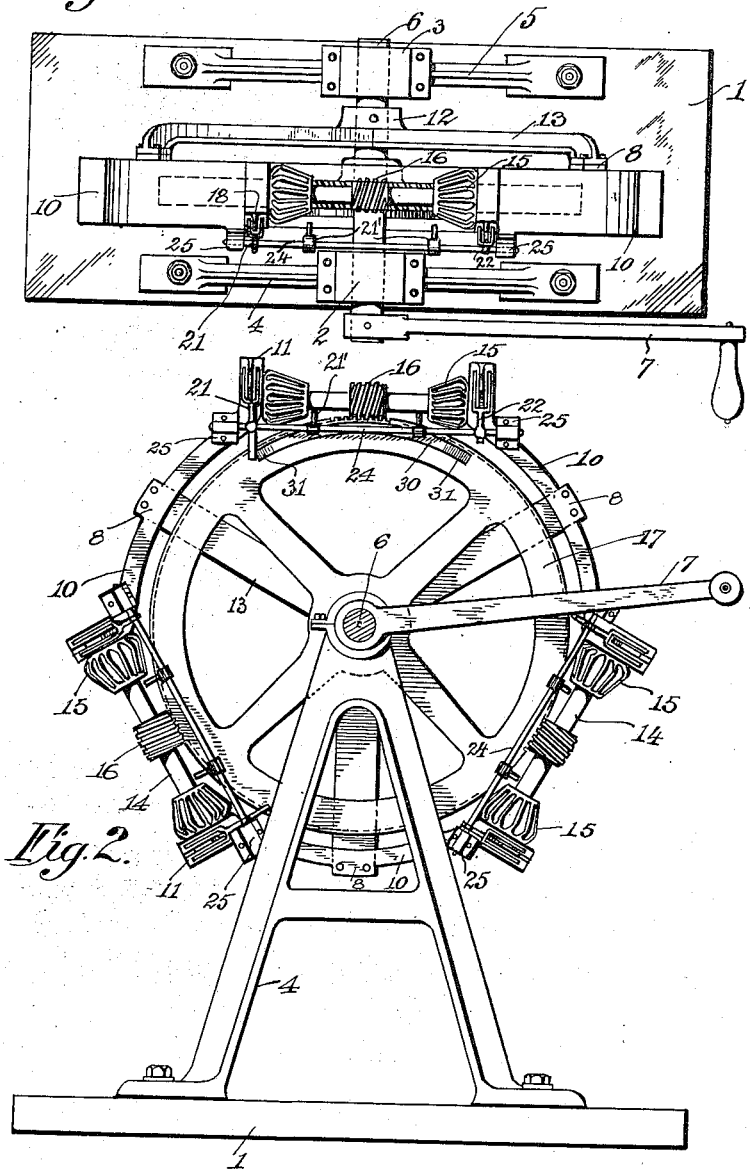

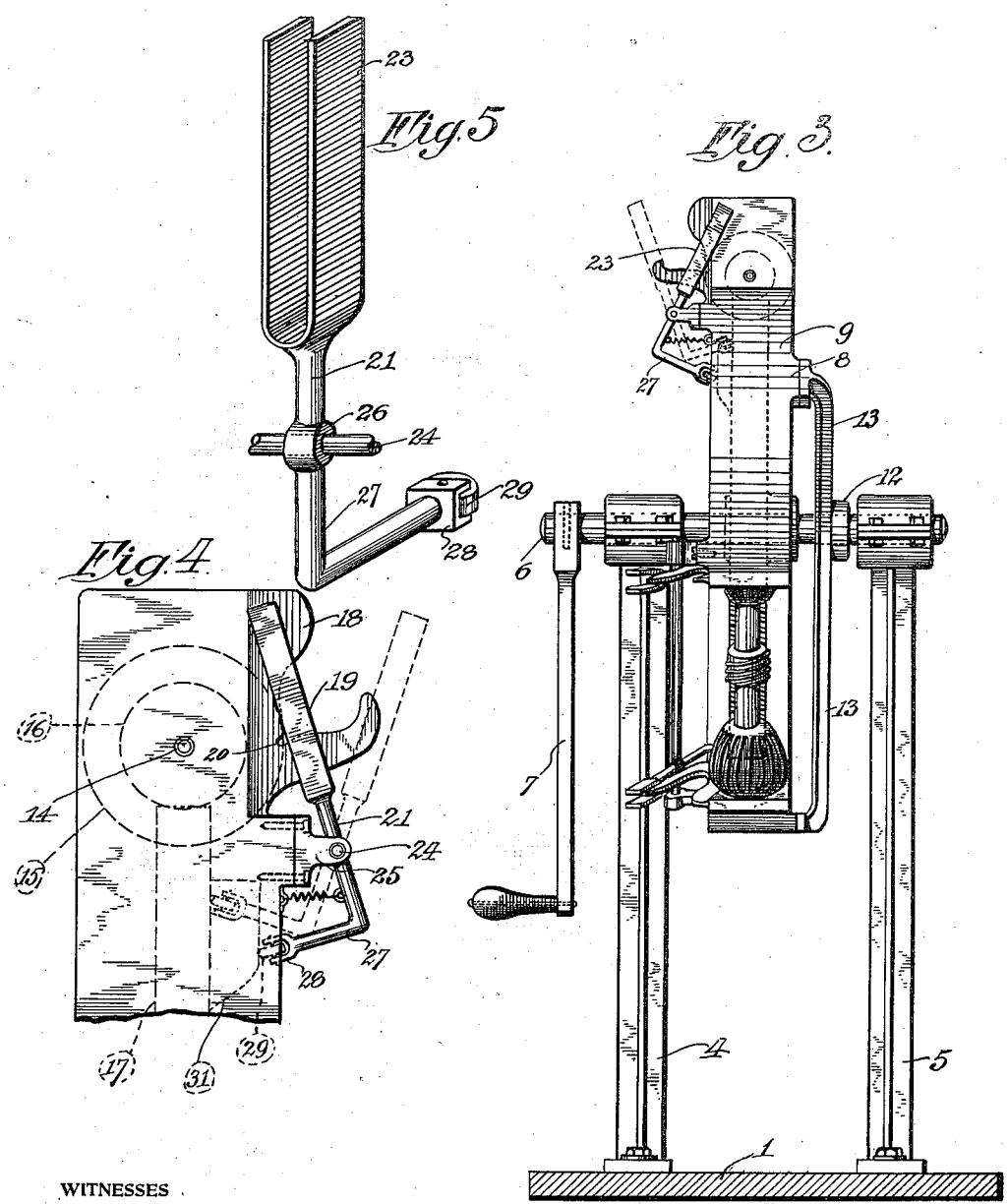

UNITED STATES PATENT OFFICE.

OSCAR GOTTFRIED MAYER, OF CHICAGO, ILLINOIS.

SAUSAGE-LINKING MACHINE.

1,179,543.  Specification of Letters Patent.  Patented Apr. 18, 1916.

Application filed January 29, 1915. Serial No. 5,063.

*To all whom it may concern:*

Be it known that I, OSCAR GOTTFRIED MAYER, packer, a citizen of the United States, residing at Chicago, State of Illinois, county of Cook, Sedgwick street and Beethoven Place, have invented new and useful Improvements in Sausage-Linking Machines, of which the following is a specification.

The invention relates to machines for dividing a stuffed sausage-casing into links of equal length and then twisting the same, whereby the links will permanently retain their form.

The object of my invention is to provide a simple and effective machine which will accomplish the dividing and twisting of sausage-casings without any possibility of rupturing or tearing the same.

Another object of the invention is to effect the twisting of the link while it is being clamped so that comparatively simple means may be employed to accomplish this end.

It is also an object of the invention to provide certain details and features of construction and combinations tending to increase the effectiveness and general desirability of a machine of this particular character.

With these and other objects in view, the invention consists in a novel combination and arrangement of parts to be hereinafter described and specifically pointed out in the appended claims.

In the accompanying drawings Figure 1 is a top plan view of the machine made in accordance with the invention, certain parts being omitted for the sake of clearness. Fig. 2 is a front elevation thereof and Fig. 3 illustrates a side view of the machine. Fig. 4 is a fragmentary side view of the carry-frame to a larger scale showing the carrying and clamping means for the stuffed sausage-casing. Fig. 5 is a perspective detail view of one of the clamping levers. Fig. 6 is a top plan view of a modified form of the machine, parts being omitted for the sake of clearness. Figs. 7 and 8 are fragmentary side views of two associated clamping means.

Referring to the drawings, 1 denotes a base plate to which a pair of bearings 2, 3 are secured in any approved manner. In the drawings supporting frames 4, 5 are shown which are rigidly secured to the base plate. A rotatable shaft 6 is journaled in said bearings and is provided at one of its ends with a crank handle 7 keyed to the shaft by means of a pin. It is understood that any other convenient means may be employed to secure the crank handle to the rotatable shaft, or the shaft may be driven by a motor.

Mounted on the shaft is a rotatable frame 9 comprising a plurality of plates 10 spaced apart and arranged in such a manner that their inner sides form parts of the periphery of a circle, for a purpose hereinafter specified. As it is obvious from the drawings, the plates 10 are curved to form arcs of a circle and are provided at their ends with upturned flanges 11, care being taken that the opposing flanges of two successive plates are parallel with each other and perpendicular to a tangential line laid midway between said flanges on the imaginary circle formed by the inner sides of the plates 10.

A spider frame, comprising a hub 12 is mounted on the rotatable shaft 6 and integral with said hub are a plurality of radially disposed arms 13, whose outer ends are connected with the central portion 8, of the plates 10. The hub 12 is keyed to the rotatable shaft by means of a pin or in any other approved manner.

In the flanges 11 of the plates 10 circular openings are provided wherein rotatable shafts 14 are journaled. Each shaft 14 has keyed thereto a roller 15, near each of its ends, while a worm gear 16 is fast to said shaft at its central portion. Loosely mounted on the rotatable shaft 6 is a stationary gear 17 provided on its periphery with spiral teeth which mesh with the worm gear 16 of the rotatable shafts 14.

From the foregoing it is evident that when the rotatable shaft 4 is rotated by means of the crank handle 7, the spider frame will rotate therewith. The worm gear 16 being in mesh with the stationary gear 17 will cause the shafts 14 and the rollers 15 to revolve planetarywise, for a purpose hereinafter specified.

The flanges 11 of the plates 10 are provided on their front side with reduced extensions formed into jaws 18 having a larger opening 19 for the reception of the stuffed sausage-casing and a narrow opening 20 communicating with the larger opening. The clamping means for dividing the stuffed sausage casing consists of a plurality of oscillatory levers 21, 22 having prongs 23 at their free ends which are so disposed that upon oscillation of the levers toward the jaws 18 the latter protrude between the prongs, and the stuffed sausage casing is forced to enter the narrow opening 20 whereby it becomes greatly reduced in circumference.

Levers 21 and 22 are rigidly secured to a rock shaft 24 journaled in bearings 25 provided on the plates 10 adjacent to their upturned flanges 11. As illustrated in Fig. 5, the levers are provided with an enlarged portion 26 having a circular opening therein for the passage of the rock shaft. The bearings 25 are detachably secured to the plates 10 in order to facilitate the assembling of the clamping device. As shown in Figs. 4 and 5, the lever 21 is provided with an extension 27 which is bent at right angles and has a forked end 28, wherein a roller 29 is journaled. A spring connecting the extension 27 with the plate 10 serves to maintain the levers in a normal position.

The stationary gear 17 is provided at a suitable distance from its periphery with a cam 30 curved concentrically with the circumference of the gear and extending over an arc of approximately one quarter of the gear periphery. The center, and main portion of the cam projects from the plane of the gear, while the front and rear ends of the cam are provided with slanting portions 31 which gradually reduce the cam to the plane of the gear. The extension 27 of the lever 21 is so arranged as to bring the roller 29 in engagement with the cam when the spider frame is rotated, whereupon the lever 21 is thrown into the position indicated in solid lines in Fig. 4. In view of the fact that levers 21 and 22 are rigidly interconnected by the rock shaft 24, the oscillation of the lever 21 is simultaneously transmitted to its companion lever 22, whereby the stuffed sausage-casing supported by the jaws 18 of adjacent flanges of two plates is simultaneously clamped at two points spaced apart equal to the distance of the levers 21, 22.

It is apparent from the drawings that the twisting rollers 15, 15 are so formed as to engage one side of the stuffed sausage-casing while the same is being clamped by the levers 21, 22, whereby said casing is forced to rotate and the clamped portions thereof retain their form permanently. A plurality of fingers 21', keyed to the shaft, force the sausage-casing into engagement with the twisting roller, when the levers 21, 22 are in the clamping position.

In the preferred embodiment of the invention three sets of clamping devices are provided so that during each revolution of the rotatable frame 9 six links are clamped off from the stuffed sausage-casing. As stated before, the clamping devices are successively brought into action when the lever 21 is engaged by the stationary cam 30 and this cam is so arranged as to effect the dividing of the sausage-casing when each set of clamping devices has reached the uppermost position.

In Figs. 6, 7 and 8, a modified form of the machine is shown working on the same principles as outlined above, but where different clamping means is provided in order to insure a smooth operation of the clamping lever and to avoid rupture or tearing of the sausage-casing when the same is extremely thin and thereby liable to disintegration.

As indicated in Fig. 7, the flanges 11 of the plates 10 are integral with two jaws 32 spaced apart a distance slightly in excess of the thickness of the lever 33, whereby a guiding means for the same is provided. In this arrangement the lever 33 is not pivoted about one point whereby a certain throw is effected when it is brought into action, but a pair of rods 34, 35 are pivotally connected at two points, one above the other, with the lever 33. As indicated in the drawings, the rods 34, 35 are forked at their forward ends, to which the lever 33 is connected, and they project from the flange 11 through suitable holes provided therefor and extend a certain distance beyond the rear edge of the flanges.

The rods are provided with turn buckles 36, 37 in order to permit adjustment of the lever such as may be necessary when sausage-casings of different circumference are used. Between the turn buckles and the rear edge of the flange 11, the rods 34, 35 are surrounded by tension springs 38 and 39 respectively, which tend to maintain the lever normally in a certain predetermined position. Both rods are of different length and have eyes at their rear ends adapted to receive connecting rods 40 and 41 respectively, which interconnect the rods 34, 35 with similar rods 42, 43 of the companion lever 44 of similar construction, in order to insure simultaneous action of both levers when they reach the uppermost position as stated for the lever 21, 22 of the preferred form shown in Fig. 2. Levers 33 and 44 are provided with transversely extending fingers 51, which force the sausage-casing into engagement with the twisting rollers 15, when the levers are brought into action. The connecting rods 40, 41 are screw threaded at their ends to receive nuts whereby transversal adjustment of the rods 34, 35 and 42, 43 respectively, may be effected. The rods 42, 43 are also provided with turn-buckles 36', 37' while they are surrounded by springs 38', 39' between the turn-buckles and the rear edge of the flange 11.

As indicated in the drawings, the connecting rods 40, 41 are situated at a distance from each other and in different horizontal planes and are provided centrally with rollers 45, 46 which are so arranged as to be in one horizontal flight. This is accomplished by means of vertical extensions 49 provided on the connecting rods 42 and 43.

A cam 47 supported from the bearing 3 or from any other suitable stationary point and preferably curved in order to compensate for the circular movement of the connecting rods, is so disposed that when the associated levers 43, 44 reach their uppermost position the cam is in engagement with the rollers 45, 46 so that the rod 34 is longitudinally displaced toward the bearing 3, while the lower rod 35 is subjected to a longitudinal displacement in the opposite direction. The same longitudinal displacement is transmitted to the rods 42, 43 whereby the levers 33, 44 are simultaneously oscillated to clamp a stuffed sausage-casing inserted in the jaws 32. Cam 47, of course, is provided at its front and rear end with slanting portions 48, 48 in order to effect a gradual displacement and return of the rod 34, 35 and the associated rods 43, 43. An arm 50 rigidly supports the cam 47 in a suitable position in order to effect its engagement with the rollers 45, 46.

Means are provided for connecting the spring 38 with the edge of the flange 11 and the rod 34 so that upon displacement of the rod the spring will return the same to its normal position when the cam 47 ceases to engage the rollers 45, 46. The advantage derived of this arrangement consists, as stated before, in the gradual clamping of the sausage-casing whereby a tearing of the comparatively thin casing is entirely excluded.

The operation of the device is as follows:— From a conveying device not shown in the drawing and not claimed as part of the invention the sausage-casing stuffed with an appropriate material is placed into the jaws 18 of the frame 9 which is rotated by turning of the handle 7. As soon the lever 21 of each of the three sets approaches its uppermost position it is forced into engagement with the cam 30 of the stationary gear 17, whereby it is thrown toward said jaw so that the casing inserted therein is compressed and forced to assume the circumference of the narrow opening 20 communicating with the larger opening 19 which originally receives the sausage-casing.

Due to the meshing of the worm gear 16 with the stationary gear 17 shafts 14 are rotated and the twisting rollers 15 provided thereon exert a torque on that portion of the sausage-casing which is clamped between the levers 21, 22 in the uppermost position. It is to be noted that the clamping and twisting of the divided link takes place simultaneously and it is furthermore to be considered that an engagement of the sausage-casing on one side only is necessary in order to effect the twisting of the divided links.

The operation of the machine when using the modified form of clamping device is identical with the operation presently described. The contrasting features are only constituted by the different method of actuating the lever and the different location of the cam. Also in the modified form of clamping device the actuation of the oscillatory lever takes place in the uppermost position when the cam 47 separates the rollers 45, 46 of the connecting rods 42, 43, whereby the rods 38 and 42 are longitudinally disposed opposite to the longitudinal displacement of rods 35, 43.

I am aware that the constructional means for clamping and twisting a stuffed sausage casing may be varied or other parts of the machine may be changed without however departing from the spirit and scope of the invention and I want to avail myself of all such departures, changes and modifications which necessarily come within the scope specifically pointed out in the appended claims.

I claim:

1. In a sausage linking machine, a rotatable frame, jaws integral with said frame for carrying the stuffed sausage-casing, sets of oscillatory levers mounted to said frame and adapted to coöperate with said jaws to divide the sausage-casing inserted therein into links, means for oscillating said levers and means carried by said frame for twisting a divided link.

2. In a sausage linking machine, a rotatable frame, jaws integral with said frame, sets of oscillatory levers coöperating with said jaws to divide the sausage-casing inserted therein into links, a pair of movable rods pivotally connected at superimposed points with each of said levers, connections between corresponding rods, means for effecting an opposite longitudinal displacement of said rods at two predetermined points during a revolution, and means carried by said rotatable frame for twisting a divided link.

3. In a sausage linking machine, a rotatable frame, jaws mounted on said frame, oscillatory levers coöperating with said jaws to divide said sausage-casing inserted therein into links, a pair of adjustable movable rods pivotally connected at two points with each of said levers, connections between corresponding rods, means for effecting an opposite longitudinal displacement of said rods at two predetermined points during a revolution and means carried by said rotatable frame for twisting a divided link.

4. In a sausage linking machine, a rotatable frame, jaws integral with said frame, oscillatory levers coöperating with said jaws to divide the stuffed sausage casing inserted therein into links, a pair of movable rods connected at two points with each of said levers, connections between corresponding rods, means for effecting an opposite longitudinal displacement of said rods at two predetermined points during a revolution, guiding means for said oscillatory levers and means carried by said rotatable frame for twisting a divided link.

5. In a sausage linking machine, a rotatable frame, jaws integral with said frame, oscillatory levers coöperating with said jaws to divide a stuffed sausage casing inserted therein into links, a pair of rods connected at two points with each of said levers, connections between corresponding rods, means for simultaneously oscillating a pair of levers and means carried by said rotatable frame for twisting said divided link.

6. In a sausage linking machine, a rotatable frame, jaws integral with said frame, oscillating levers coöperating with said jaws to divide a stuffed sausage casing inserted therein into links, a pair of rods connected at two points with each of said levers, adjustable connections between corresponding rods, means for simultaneously oscillating a pair of levers and means carried by said rotatable frame for twisting said link.

7. In a sausage linking machine, a rotatable frame, jaws integral with said frame for carrying the stuffed sausage casing, sets of oscillatory levers mounted to said frame and adapted to coöperate with said jaws to divide the sausage casing inserted therein into links, means for oscillating said levers and means carried by said frame for twisting a divided link, said oscillating levers being adapted to force the sausage casing into engagement with said twisting means when in operative position.

8. In a sausage linking machine, a rotatable frame, jaws integral with said frame, oscillating levers coöperating with said jaws to divide the stuffed sausage casing inserted therein into links, a pair of rods connected at two points with each of said levers, adjustable connections between corresponding rods, means for simultaneously oscillating a pair of levers and means carried by said rotatable frame for twisting said links, said oscillating levers being adapted to force the sausage casing into engagement with said twisting means when in operative position.

In testimony whereof I affix my signature in presence of two witnesses.

OSCAR GOTTFRIED MAYER.

Witnesses:
BARTHOLD OBLATT,
OTTO GANS.